United States Patent
Yanamoto

(10) Patent No.: US 8,711,478 B2
(45) Date of Patent: Apr. 29, 2014

(54) STEREOSCOPIC DISPLAY

(75) Inventor: Kaoru Yanamoto, Kanagawa (JP)

(73) Assignee: Sony Corporation, Tokyo (JP)

(*) Notice: Subject to any disclaimer, the term of this patent is extended or adjusted under 35 U.S.C. 154(b) by 424 days.

(21) Appl. No.: 12/795,900

(22) Filed: Jun. 8, 2010

(65) Prior Publication Data

US 2011/0007390 A1    Jan. 13, 2011

(30) Foreign Application Priority Data

Jul. 7, 2009  (JP) .................... P2009-160904

(51) Int. Cl.
  *G02B 27/22*  (2006.01)
  *G02B 26/00*  (2006.01)
  *G02F 1/29*  (2006.01)
  *G02B 27/10*  (2006.01)
  *G09G 3/00*  (2006.01)
  *H04N 5/89*  (2006.01)

(52) U.S. Cl.
  USPC ........... 359/464; 359/237; 359/320; 359/618; 345/32; 348/40

(58) Field of Classification Search
  USPC ......... 359/464, 237, 245–246, 248–254, 256, 359/279, 320, 618; 345/32–33; 348/40–42
  See application file for complete search history.

(56) References Cited

U.S. PATENT DOCUMENTS

| | | | |
|---|---|---|---|
| 6,064,424 A | 5/2000 | van Berkel et al. | |
| 2002/0113866 A1* | 8/2002 | Taniguchi et al. | 348/51 |
| 2004/0240777 A1* | 12/2004 | Woodgate et al. | 385/16 |
| 2005/0073577 A1* | 4/2005 | Sudo et al. | 348/51 |
| 2005/0225502 A1* | 10/2005 | Nam et al. | 345/55 |
| 2008/0231690 A1* | 9/2008 | Woodgate et al. | 348/51 |
| 2009/0244682 A1* | 10/2009 | Saishu et al. | 359/246 |

FOREIGN PATENT DOCUMENTS

| | | |
|---|---|---|
| JP | 08-331605 | 12/1996 |
| JP | 3096613 | 8/2000 |
| JP | 2006-154809 | 6/2006 |
| JP | 2008-107764 | 5/2008 |

OTHER PUBLICATIONS

Japanese Office Action issued Mar. 28, 2013 in corresponding Japanese Patent Application No. 2009-160904.

* cited by examiner

*Primary Examiner* — Dawayne A Pinkney
(74) *Attorney, Agent, or Firm* — K&L Gates LLP

(57) ABSTRACT

A stereoscopic display includes: a display panel in which sub-pixels of a plurality of colors are arranged in a predetermined arrangement pattern; and a parallax barrier having a barrier pattern including transmission sections allowing light to pass therethrough and a shielding section shielding light. The arrangement pattern and the barrier pattern are configured in such a manner that stereoscopic vision is achieved when the display panel and the parallax barrier are both in a first arrangement state and in a second arrangement state, the first arrangement state and the second arrangement state having such a positional relationship that vertical direction and horizontal direction are interchanged with each other.

15 Claims, 17 Drawing Sheets

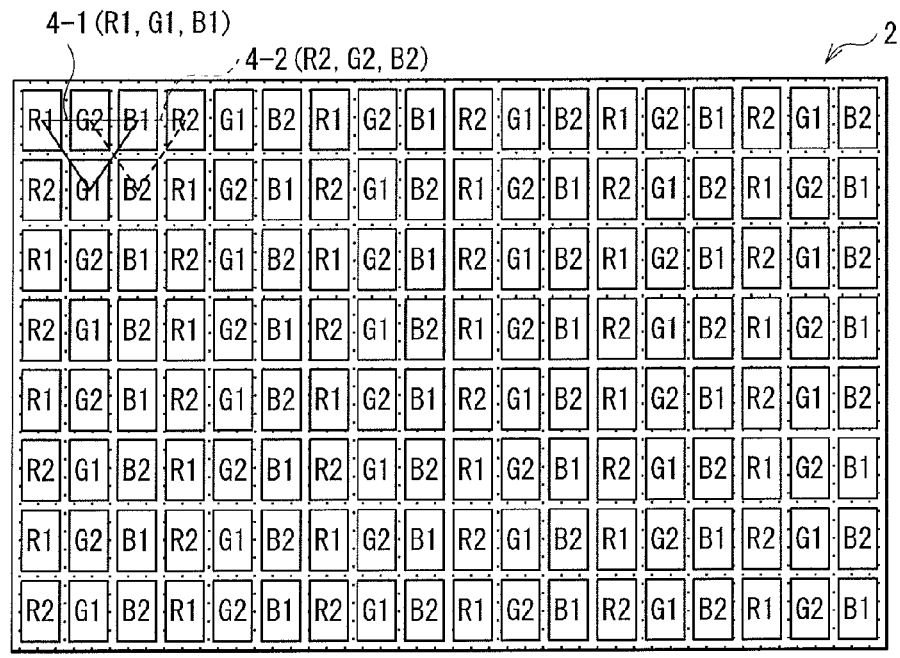
F I G. 8
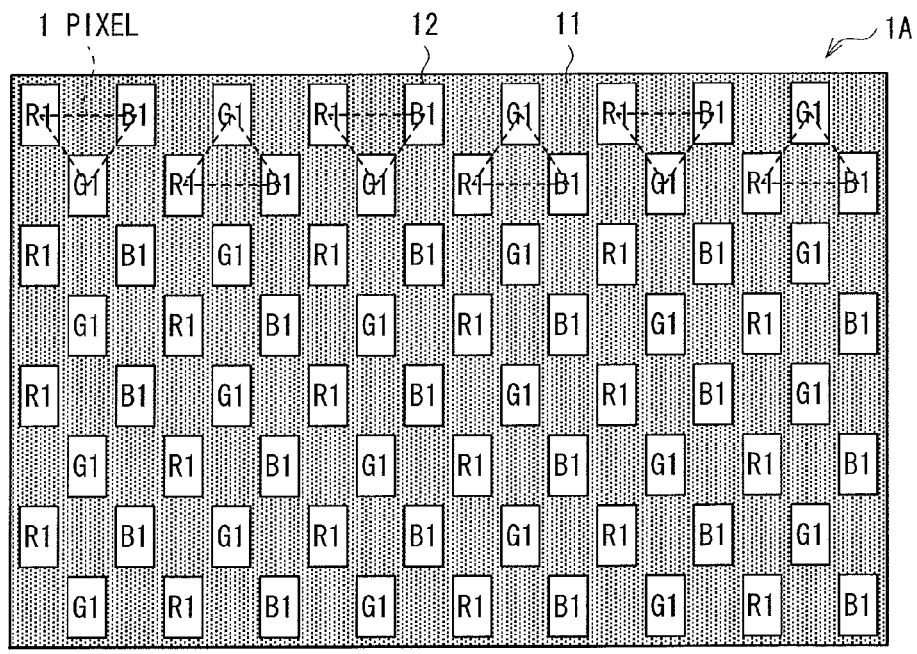
F I G. 9

STEREOSCOPIC DISPLAY

CROSS REFERENCES TO RELATED APPLICATIONS

The present application claims priority to Japanese Priority Patent Application JP 2009-160904 filed in the Japan Patent Office on Jul. 7, 2009, the entire content of which is hereby incorporated by reference.

BACKGROUND

The present application relates to a parallax barrier system stereoscopic display.

In related art, as one of stereoscopic display systems which are allowed to achieve stereoscopic vision with naked eyes without wearing special glasses, a parallax barrier system stereoscopic display (see Japanese Patent No. 3096613) or a lenticular system stereoscopic display (see U.S. Pat. No. 6,064,424) is known. FIG. 22 illustrates a typical configuration example of the parallax barrier system stereoscopic display. In the stereoscopic display, a parallax barrier 101 is arranged so as to face a front surface of a two-dimensional display panel 102. In a typical configuration of the parallax barrier 101, shielding sections 111 shielding display image light from the two-dimensional display panel 102 and stripe-shaped slit sections 112 allowing the display image light to pass therethrough are alternately arranged in a horizontal direction. As the two-dimensional display panel 102, a two-dimensional display panel with a pixel configuration in which a plurality of pixels configured of sub-pixels of a plurality of colors (R, G and B) are two-dimensionally arranged is used. For example, such a pixel arrangement that sub-pixels of different respective colors are cyclically arranged along a horizontal line, and sub-pixels of a same color are arranged along a vertical line is used.

In the parallax barrier system or lenticular system stereoscopic display, a plurality of parallax images including different parallax information, respectively, are prepared, and, for example, each of the parallax images are separated into a plurality of stripe-shaped separated images extending in a vertical direction. Then, the separated images of the plurality of parallax images are alternately arranged in a horizontal direction so as to produce a composite image including a plurality of stripe-shaped parallax images in one screen, and the composite image is displayed on the two-dimensional display panel 102. In the case of the parallax barrier system, the composite image displayed on the two-dimensional display panel 102 is viewed through the parallax barrier 101. When the widths of the separated images to be displayed, a slit width in the parallax barrier 101 and the like are appropriately set, in the case where a viewer watches the stereoscopic display from a predetermined position and a predetermined direction, light rays from different parallax images are allowed to enter into right and left eyes 10R and 10L of the viewer, respectively, through the slit sections 112. Thus, when the viewer watches the stereoscopic display from a predetermined position and a predetermined direction, a stereoscopic image is perceived. To achieve stereoscopic vision, it is necessary for the right and left eyes 10R and 10L to view different parallax images, respectively, so two or more parallax images, that is, an image for right eye and an image for left eye are necessary. In the case where three or more parallax images are used, multi-view vision is achievable. When more parallax images are used, stereoscopic vision in response to changes in viewing position of the viewer is achievable. That is, motion parallax is obtained.

SUMMARY

In a typical stationary display, the display state in longitudinal and transverse directions (arrangement state) of a screen is consistently fixed. For example, in the case of a stationary display of which the screen is landscape-oriented, the display state is consistently fixed to a landscape-oriented display state. However, for example, in a mobile device such as a recent cellular phone, a display in which the display state of a screen of a display section is switchable between a portrait-oriented state and a landscape-oriented state has been developed. Such switching between a portrait-oriented display state and a landscape-oriented display state is achievable, for example, by independently rotating the whole device or a display section by 90° in a plane parallel to a display surface and also rotating a displayed image by 90°.

Now, it is considered that stereoscopic display is performed in a device which is allowed to switch between a portrait-oriented state and a landscape-oriented state. In both of a parallax barrier system and a lenticular system, an image for right eye and an image for left eye displayed on a two-dimensional display panel are separated by parallax in a horizontal direction by a parallax separation means (such as a parallax barrier or a lenticular lens) to achieve stereoscopic vision. Moreover, typically the parallax barrier and the lenticular lens which are parallax separation means are fixed with respect to a display surface of a two-dimensional display panel. Therefore, stereoscopic display is allowed to be properly performed only in one of a portrait-oriented display state and a landscape-oriented display state. For example, in the case where in the lenticular system, a lenticular lens is arranged so as to properly perform stereoscopic display in the landscape-oriented display state, in the portrait-oriented display state, it is difficult to properly achieve stereoscopic vision, because the lenticular lens has refractive power in a vertical direction but does not have refractive power in a lateral direction. Likewise, also in the parallax barrier system, for example, as illustrated in FIG. 22, in the case where a parallax barrier 101 including vertically long slit sections 112 is used, when the whole display is rotated to a portrait-oriented state, light rays are not separated in a lateral direction, so stereoscopic vision is not achieved.

It is desirable to provide a stereoscopic display which is allowed to achieve stereoscopic vision in two different arrangement states by a parallax barrier system.

According to a first embodiment, there is provided a stereoscopic display including: a display panel including a display surface in which sub-pixels of a plurality of colors are two-dimensionally arranged in a predetermined arrangement pattern, and displaying a plurality of parallax images corresponding to the number of viewpoints in stereoscopic vision, the parallax images being combined into one screen while spatially separated from one another; and a parallax barrier arranged to face the display surface, including a barrier pattern configured of transmission sections allowing display image light from the display panel to pass therethrough and a shielding section shielding the display image light, and optically separating, with the barrier pattern, the parallax images displayed on the display panel from one another so as to achieve stereoscopic vision. The display surface of the display panel has a vertical length different from a horizontal length thereof. The predetermined arrangement pattern of the sub-pixels in the display panel and the barrier pattern in the parallax barrier are configured in such a manner that stereoscopic vision is achieved when the display panel and the parallax barrier are both in a first arrangement state and in a second arrangement state, the first arrangement state and the second arrangement state having such a positional relationship that vertical direction and horizontal direction are interchanged with each other.

In the stereoscopic display according to an embodiment, display image light from the display panel is optically separated with the parallax barrier so as to achieve natural stereoscopic vision in both of the first arrangement state and the second arrangement state.

According to a second embodiment, there is provided a stereoscopic display including: a display panel in which sub-pixels of a plurality of colors are arranged in a predetermined arrangement pattern; and a parallax barrier having a barrier pattern including transmission sections allowing light to pass therethrough and a shielding section shielding light. The arrangement pattern and the barrier pattern are configured in such a manner that stereoscopic vision is achieved when the display panel and the parallax barrier are both in a first arrangement state and in a second arrangement state, the first arrangement state and the second arrangement state having such a positional relationship that vertical direction and horizontal direction are interchanged with each other.

In the stereoscopic display according to an embodiment, the predetermined arrangement pattern of the sub-pixels in the display panel and the barrier pattern in the parallax barrier are optimized so as to achieve stereoscopic vision in both of the first arrangement state and the second arrangement state, so stereoscopic vision is achievable in both of different arrangement states by a parallax barrier system.

Additional features and advantages are described herein, and will be apparent from the following Detailed Description and the figures.

BRIEF DESCRIPTION OF THE FIGURES

FIG. 8 is a plan view illustrating a pixel arrangement for two viewpoints in the first arrangement state in the stereoscopic display according to the first embodiment.

FIG. 9 is a plan view illustrating a barrier pattern for two viewpoints in the first arrangement state in the stereoscopic display according to the first embodiment.

DETAILED DESCRIPTION

The present application will be described in detail below with reference to the figures according to an embodiment.

First Embodiment

Basic Configuration of Stereoscopic Display

Figure 1:
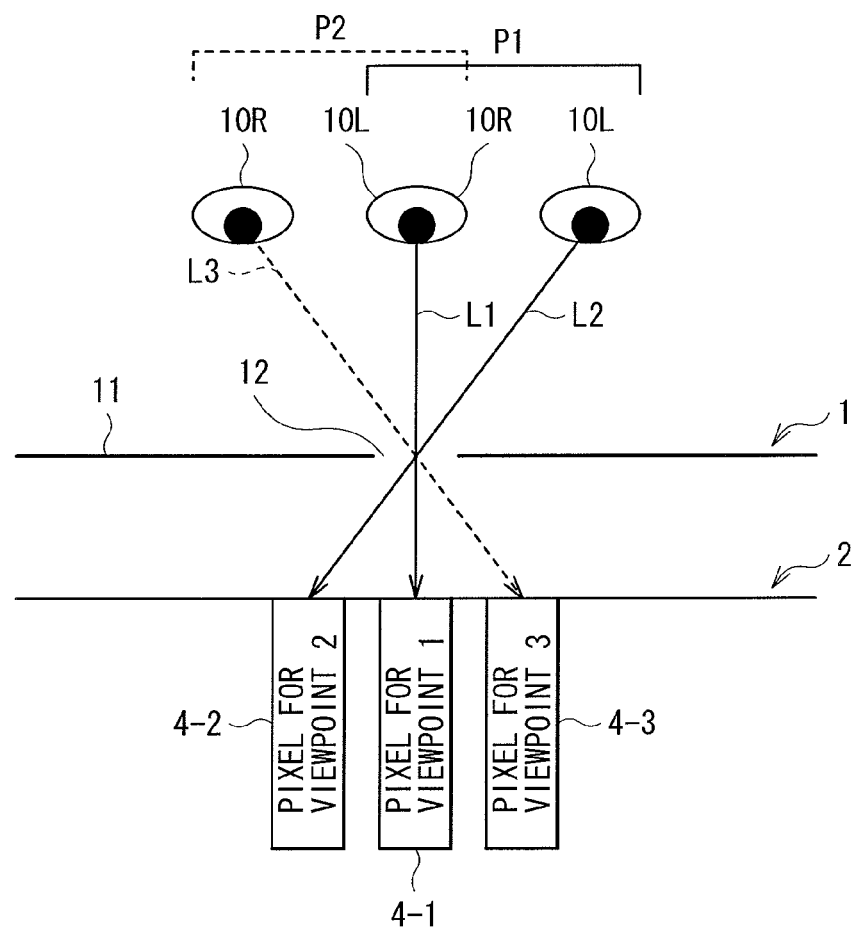
FIG. 1 is a configuration diagram illustrating a configuration of a stereoscopic display according to a first embodiment and a stereoscopic vision state in the case where the number of viewpoints is three.

FIG. 1 schematically illustrates a configuration of a stereoscopic display according to a first embodiment and a stereoscopic vision state in the case where the number of viewpoints is three. As illustrated in FIG. 1, the stereoscopic display includes a display panel 2 and a parallax barrier 1 arranged to face a display surface of the display panel 2. The display panel 2 displays a plurality of parallax images which are combined into one screen while spatially separated from one another, corresponding to the number of viewpoints in stereoscopic vision. FIG. 1 illustrates a state where multi-view (three-viewpoint) stereoscopic vision is achieved with use of a pixel 4-1 for a first viewpoint, a pixel 4-2 for a second viewpoint and a pixel 4-3 for a third viewpoint. The parallax barrier 1 has a barrier pattern including slit sections 12 allowing display image light from the display panel 2 to pass therethrough and a shielding section 11 shielding the display image light. The parallax barrier 1 optically separates parallax images displayed on the display panel 2 with the barrier pattern so as to achieve stereoscopic vision.

The stereoscopic display is configured so that natural stereoscopic vision is achievable in both of two states, that is, a state where the display panel 2 and the parallax barrier 1 are in a first arrangement state and a state where the display panel 2 and the parallax barrier 1 are in a second arrangement state which is defined as a state where arrangement directions of the display panel 2 and the parallax barrier 1 are rotated by 90°, in a plane parallel to a display surface, from arrangement directions of the display panel 2 and the parallax barrier 1 in the first arrangement state. The second arrangement state has such a positional relationship that vertical direction and horizontal direction are interchanged with each other. For example, as illustrated in a part A in FIG. 2, the "first arrangement state" is defined as a state where a horizontal length of a display surface is longer than a vertical length of the display surface (the number of pixels in a horizontal direction is larger). For example, as illustrated in a part B in FIG. 2, the "second arrangement state" is defined as a state where a vertical length of a display surface is longer than a horizontal length of the display surface (the number of pixels in a vertical direction is larger).

The display panel 2 includes a display surface in which sub-pixels of a plurality of colors are two-dimensionally arranged in a predetermined arrangement pattern. As the display panel 2, for example, a liquid crystal display, an organic EL (Electro-Luminescence) display, a plasma display panel or the like may be used.

Figure 3:
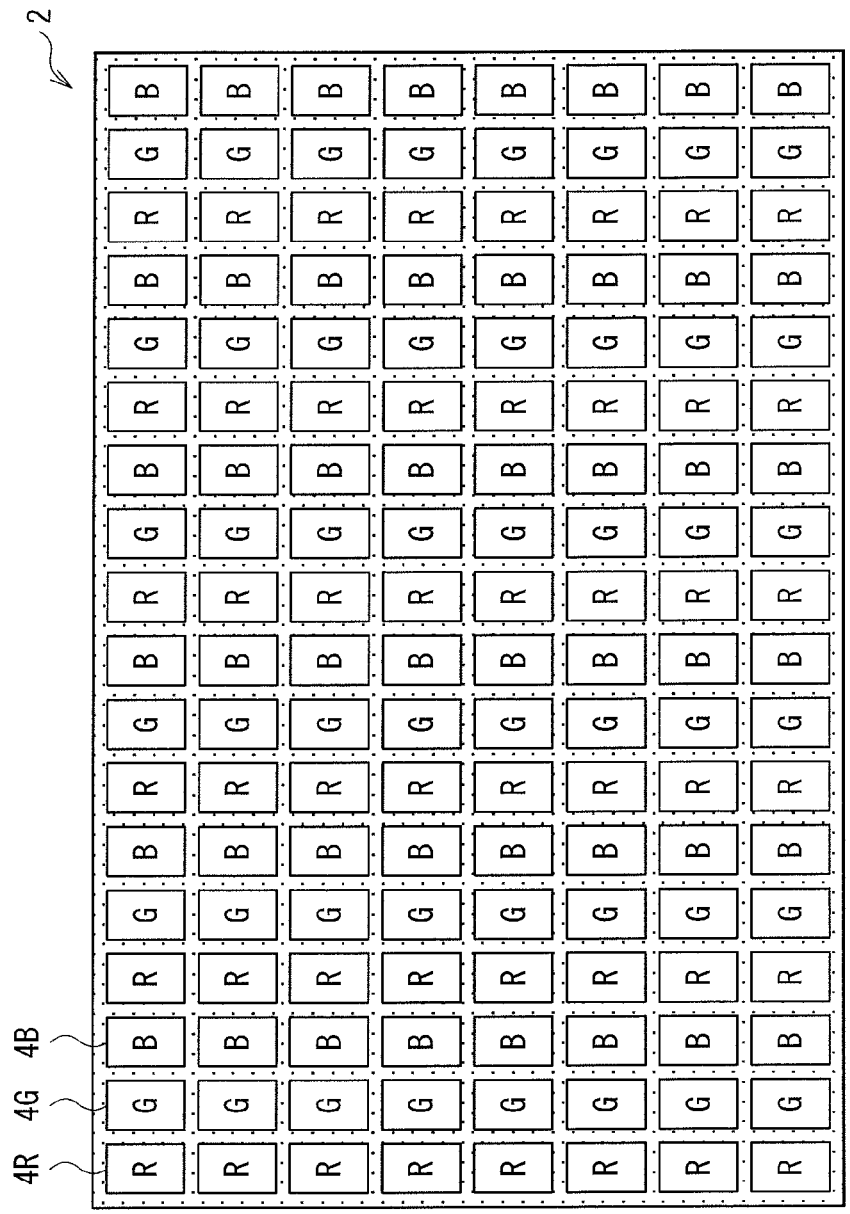
FIG. 3 is a plan view illustrating a basic pixel arrangement in a display surface of a display panel.

FIG. 3 illustrates a basic pixel arrangement in the display surface of the display panel 2. The display surface of the display panel 2 has a pixel configuration in which a plurality of sub-pixels 4R, 4G and 4B of three necessary colors R (red), G (green) and B (blue) for color display are two-dimensionally arranged. In the display panel 2, in the first arrangement state, the sub-pixels 4R, 4G and 4B are arranged in such a pixel arrangement that sub-pixels of a same color are arranged in a vertical (longitudinal) line and sub-pixels of different respective colors are cyclically arranged along a horizontal (transverse) line. In such a pixel configuration, the sub-pixels 4R, 4G and 4B in a predetermined arrangement pattern are allocated as pixels for viewpoints for displaying a plurality of parallax images corresponding to the number of viewpoints in stereoscopic vision.

In the stereoscopic display, the arrangement pattern of sub-pixels in the display panel 2 and a barrier pattern in the parallax barrier 1 are optimized so that stereoscopic vision is achieved in both of the first arrangement state and the second arrangement state. Specific examples of the arrangement pattern of sub-pixels and the barrier pattern will be described below.

Configuration for Three Viewpoints

Figure 4:
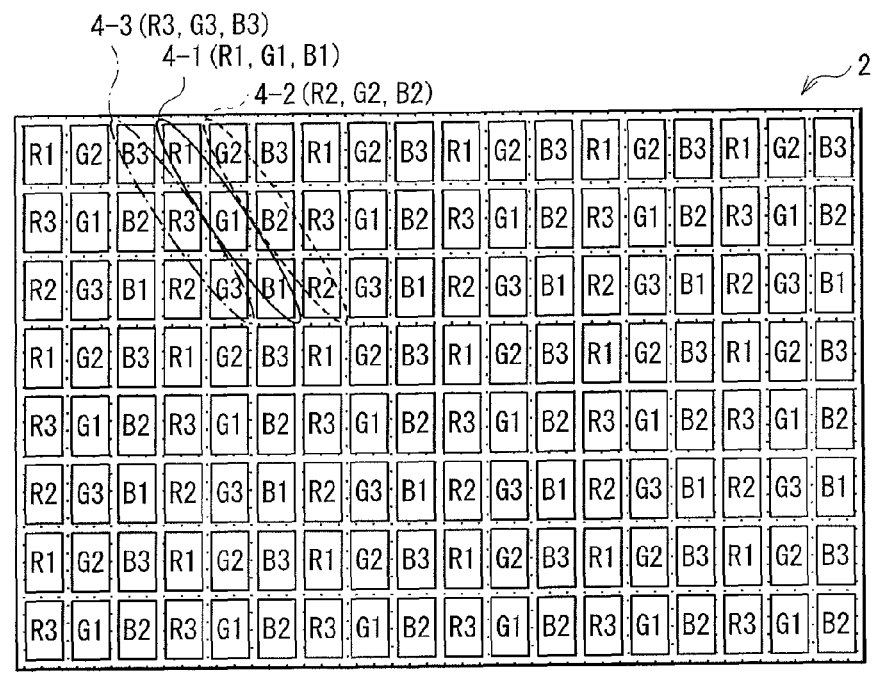
FIG. 4 is a plan view illustrating a pixel arrangement for three viewpoints in the first arrangement state in the stereoscopic display according to the first embodiment.

FIG. 4 illustrates a pixel arrangement pattern for three viewpoints in the case where the display panel 2 is in the first arrangement state. In the case where stereoscopic display corresponding to a number N (in this case, three) of viewpoints is performed, the display panel 2 displays the number N of parallax images which are combined into one screen while spatially separated from one another. In FIG. 4, a pixel group (R1, G1, B1) is a pixel 4-1 for a first viewpoint (a pixel displaying a first parallax image). Moreover, a pixel group (R2, G2, B2) is a pixel 4-2 for a second viewpoint (a pixel displaying a second parallax image) and a pixel group (R3, G3, B3) is a pixel 4-3 for a third viewpoint (a pixel displaying a third parallax image).

As illustrated in FIG. 4, in the first arrangement state, sub-pixels of a same color for the number N (in this case, three) of viewpoints are cyclically arranged along a vertical line. Sub-pixels of different respective colors for three viewpoints are cyclically arranged along a horizontal line. Moreover, such an arrangement pattern that sub-pixels for different respective viewpoints are cyclically arranged along the horizontal line in such a manner that a sub-pixel in a first horizontal line and a sub-pixel, immediately adjacent to the sub-pixel in a vertical direction, in a second horizontal line immediately adjacent to the first horizontal line are arranged for respective viewpoints different from each other is used. For example, when a pixel line in the uppermost row and a pixel line in the second uppermost row are defined as the first horizontal line and the second horizontal line, respectively, sub-pixels for different respective viewpoints are cyclically arranged in order of (R1, G2, B3, R1, G2, . . . ) in the first horizontal line. In the second horizontal line, sub-pixels for different respective viewpoints are cyclically arranged in order of (R3, G1, B2, R3, G1, . . . ). In this case, for example, the leftmost pixel in the first horizontal line is R1, and the leftmost pixel in the second horizontal line is R3, and sub-pixels are arranged in two adjacent horizontal lines so that vertically adjacent sub-pixels have different respective viewpoints form each other. In such a pixel arrangement, as illustrated in FIG. 4, a combination of sub-pixels of three different respective colors which are adjacent to one another in a diagonal direction (which are successively arranged in a diagonal direction) is used as a unit pixel (one pixel) for color display to display a parallax image for each viewpoint. In other words, for example, a combination of pixels (R1, G1, B1) which are adjacent to one another in a diagonal direction is defined as the pixel 4-1 for the first viewpoint.

Figure 5:
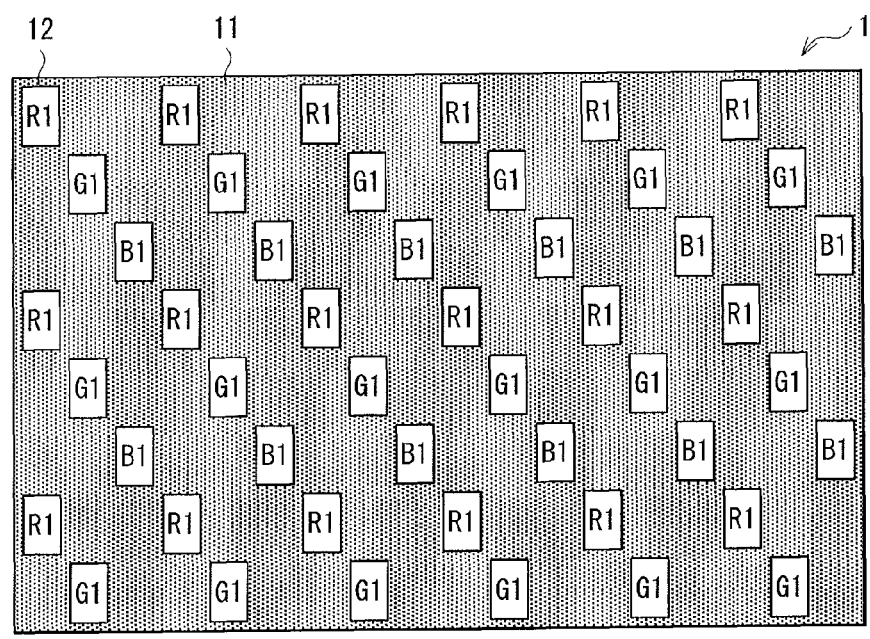
FIG. 5 is a plan view illustrating a barrier pattern for three viewpoints in the first arrangement state in the stereoscopic display according to the first embodiment.

FIG. 5 illustrates a barrier pattern for three viewpoints (corresponding to the pixel arrangement pattern in FIG. 4) in the case where the parallax barrier 1 is in the first arrangement state. In addition, FIG. 5 illustrates a state where only the pixel groups (R1, G1, B1) for the first viewpoint are allowed to be viewed through the slit sections 12 as an example. When viewed from a different direction, only the pixel groups (R2, G2, B2) for the second viewpoint are allowed to be viewed through the slit sections 12. Moreover, when viewed from another different direction, only the pixel groups (R3, G3, B3) for the third viewpoint are allowed to be viewed through the slit sections 12. The barrier pattern is formed so that only pixel groups for a specific viewpoint corresponding to a viewing direction are allowed to be viewed. More specifically, in the first arrangement state, the slit sections 12 are arranged in such a manner that one slit section 12 is allocated for every N (in this case, three) sub-pixels in the horizontal direction. Moreover, the slit sections 12 in a first horizontal line and a second horizontal line are arranged in a staggered configuration in such a manner that each of the slit sections 12 in the first horizontal line is arranged at a position shifted from the corresponding slit section 12 in the second horizontal line by an offset distance of one sub-pixel. For example, when a line of the slit sections 12 corresponding to a pixel line in the uppermost row and a line of the slit sections 12 corresponding to a pixel line in the second uppermost row are defined as a first horizontal line and a second horizontal line, respectively, the slit sections 12 in the second horizontal line are shifted to the right by one sub-pixel from the slit sections 12 in the first horizontal line. In addition, the slit sections 12 in the second horizontal line may be shifted not to the right but to the left by one sub-pixel.

Figure 6:
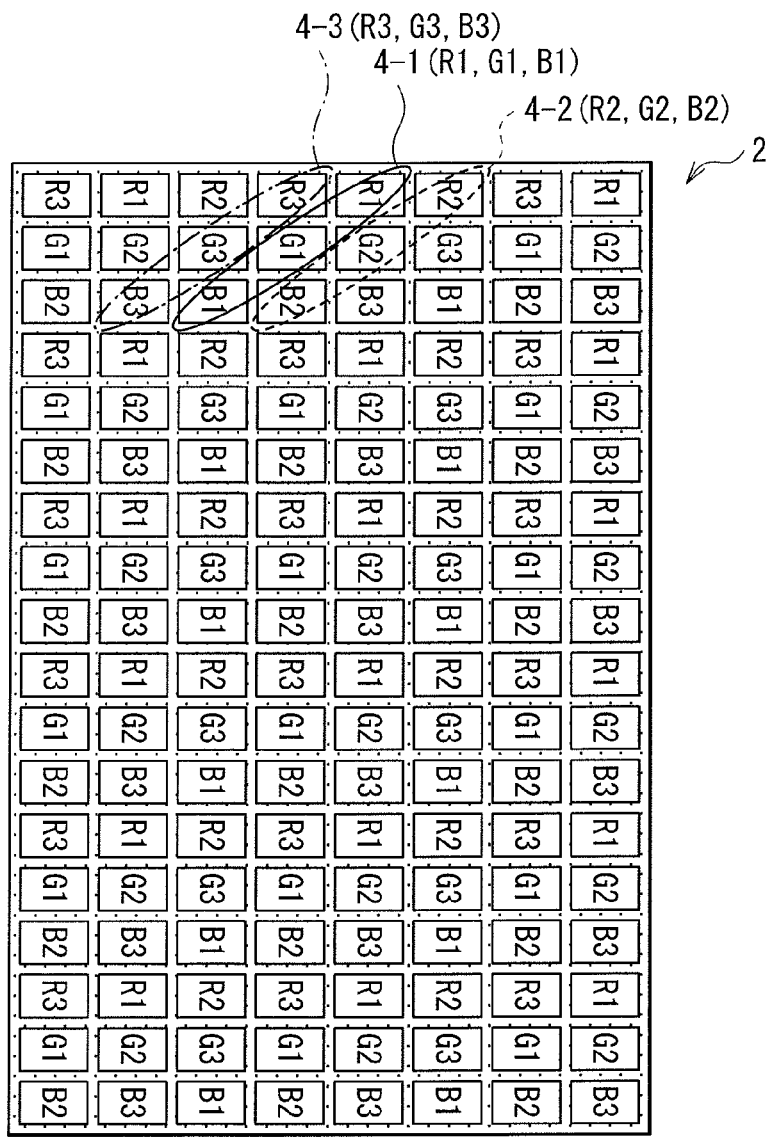
FIG. 6 is a plan view illustrating a pixel arrangement for three viewpoints in the second arrangement state in the stereoscopic display according to the first embodiment.
Figure 7:
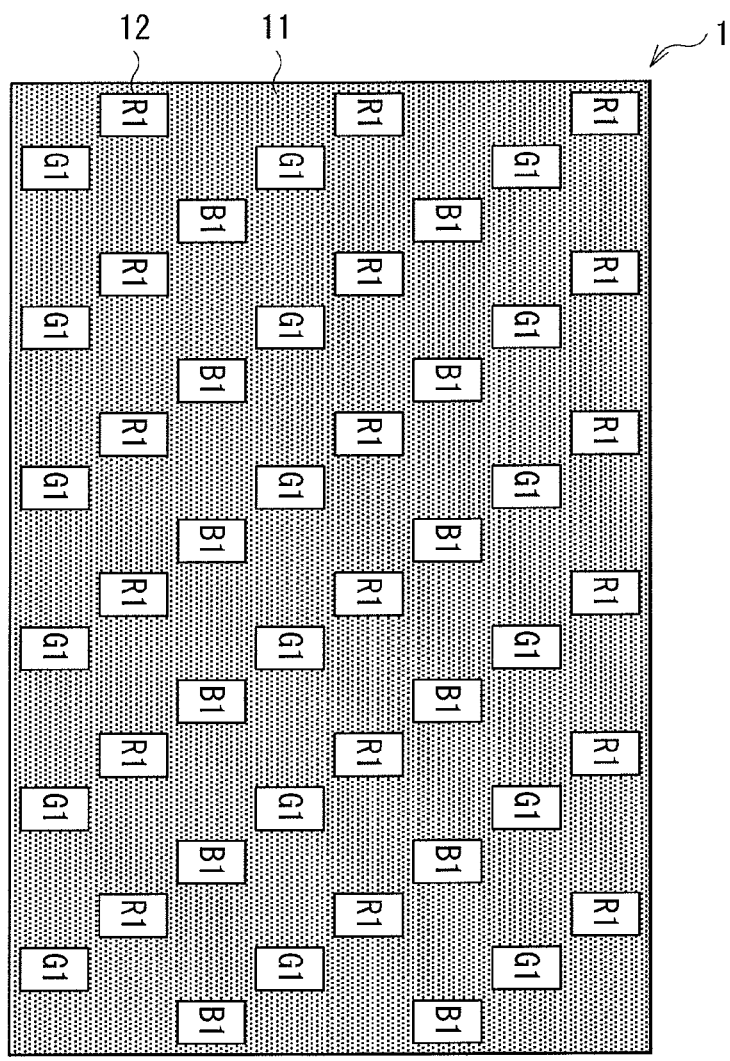
FIG. 7 is a plan view illustrating a barrier pattern for three viewpoints in the second arrangement state in the stereoscopic display according to the first embodiment.

FIG. 6 illustrates a pixel arrangement pattern for three viewpoints in the case where the display panel 2 is in the second arrangement state. The pixel arrangement pattern is a pattern where the arrangement direction of the display panel 2 is rotated to the right by 90°, in a plane parallel to the display surface, from the arrangement direction of the display panel 2 illustrated in FIG. 4. Moreover, FIG. 7 illustrates a barrier pattern for three viewpoints (corresponding to the pixel arrangement pattern in FIG. 6) in the case where the parallax barrier 1 is in the second arrangement state. The barrier pattern is a pattern where the arrangement direction of the parallax barrier 1 is rotated to the right by 90°, in a plane parallel to the display surface, from the arrangement direction of the parallax barrier 1 illustrated in FIG. 5. In addition, in FIG. 7, as in the case of FIG. 5, a state where only the pixel groups (R1, G1, B1) for the first viewpoint are allowed to be viewed through the slit sections 12 is illustrated as an example.

As illustrated in FIG. 6, also in the second arrangement state, a combination of sub-pixels of three different respective colors which are adjacent to one another in a diagonal direction is used as one pixel to display a parallax image for each of the number N (in this case, three) of viewpoints. It is obvious from FIGS. 4 and 6 that in the display panel 2, a relative positional relationship among parallax images in the horizontal direction is the same in the first arrangement state and the second arrangement state. For example, the pixel 4-2 (R2, G2, B2) for the second viewpoint is located on the right of the pixel 4-1 (R1, G1, B1) for the first viewpoint, and the pixel 4-3 (R3, G3, B3) for the third viewpoint is located on the left of the pixel 4-1 (R1, G1, B1) for the first viewpoint. The relative positional relationship is not different between the first arrangement state and the second arrangement state. Thereby, in both of the first arrangement state and the second arrangement state, parallax images for the viewpoints are allowed to be alternately displayed in the horizontal direction. Moreover, the barrier pattern of the parallax barrier 1 is a pattern allowed to separate parallax images for the viewpoints from one another in the horizontal direction in both of the first arrangement state and the second arrangement state. Thereby, in both of the first arrangement state and the second arrangement state, stereoscopic vision from three viewpoints is achievable.

Configuration for Two Viewpoints

FIG. 8 illustrates a pixel arrangement pattern for two viewpoints as a configuration example in the case where the display panel 2 is in the first arrangement state. In this configuration example, the display panel 2 displays a first parallax image (for example, a parallax image for left eye) and a second parallax image (for example, a parallax image for right eye) which are combined into one screen while spatially separated from each other. In FIG. 8, a pixel group (R1, G1, B1) is a pixel 4-1 for a first viewpoint (a pixel displaying the first parallax image). Moreover, a pixel group (R2, G2, B2) is a pixel 4-2 for a second viewpoint (a pixel displaying the second parallax image).

As illustrated in FIG. 8, in the first arrangement state, sub-pixels of a same color for the first viewpoint and the second viewpoint are cyclically arranged along a vertical line. Sub-pixels of different respective colors for the first viewpoint and the second viewpoint are cyclically arranged along a horizontal line. Moreover, as in the case of the pixel arrangement pattern for three viewpoints illustrated in FIG. 4, such an arrangement pattern that a sub-pixel in a first horizontal line and a sub-pixel, immediately adjacent to the sub-pixel in a vertical direction, in a second horizontal line immediately adjacent to the first horizontal line are arranged for respective viewpoints different from each other is used. In this configuration example, a positional relationship of sub-pixels used as one pixel is different from that in the pixel arrangement pattern for three viewpoints illustrated in FIG. 4. In the configuration example, as illustrated in FIG. 8, a combination of adjacent sub-pixels of three colors forming a triangle is used as a unit pixel (one pixel) for color display to display a parallax image for each viewpoint. In other words, for example, when a pixel line in the uppermost row is defined as a first horizontal line, and a pixel line in the second uppermost row is defined as a second horizontal line, two sub-pixels in the first horizontal line and one sub-pixel in the second horizontal line are combined to form one pixel. For example, at a top left corner of FIG. 8, two sub-pixels (R1, B1) in the first horizontal line and one sub-pixel (G1) in the second horizontal line are combined to form one pixel 4-1 for the first viewpoint.

FIG. 9 illustrates a configuration of a parallax barrier 1A having a barrier pattern for two viewpoints (corresponding to the pixel arrangement pattern in FIG. 8) in the case where the parallax barrier 1A is in the first arrangement state. In addition, in FIG. 9, as in the case of FIG. 5, a state where only the pixel groups (R1, G1, B1) for the first viewpoint are allowed to be viewed through the slit sections 12 is illustrated as an example. When viewed from a different direction, only the pixel groups (R2, G2, B2) for the second viewpoint are allowed to be viewed through the slit sections 12. Thus, as in the case of FIG. 5, the barrier pattern is formed so that only pixel groups for a specific viewpoint corresponding to a viewing direction are allowed to be viewed.

In addition, also in the configuration example (not illustrated), as in the case of a configuration example for three viewpoints, in the display panel 2, a relative positional relationship between parallax images in the horizontal direction is the same in the first arrangement state and the second arrangement state. Thereby, in both of the first arrangement state and the second arrangement state, parallax images for viewpoints are allowed to be alternately displayed in the horizontal direction. Moreover, the barrier pattern of the parallax barrier 1A is also a pattern allowed to separate parallax images for the viewpoints from each other in the horizontal direction in both of the first arrangement state and the second arrangement state. Thereby, in both of the first arrangement state and the second arrangement state, stereoscopic vision from two viewpoints is achievable.

Configuration for Four Viewpoints

Figure 10:
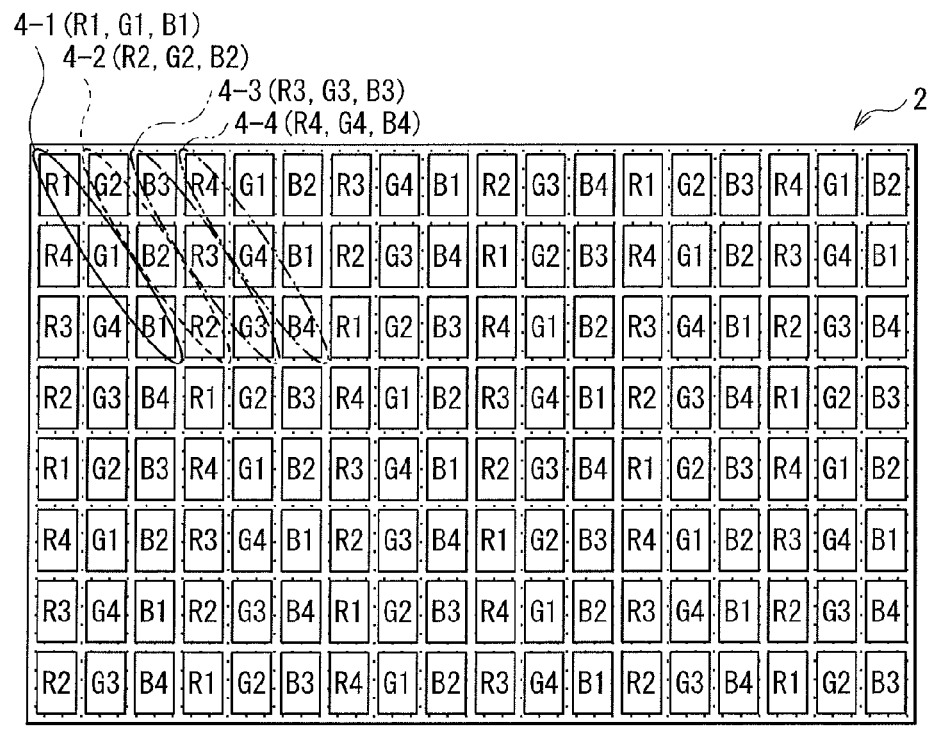
FIG. 10 is a plan view illustrating a pixel arrangement for four viewpoints in the first arrangement state in the stereoscopic display according to the first embodiment.

FIG. 10 illustrates a pixel arrangement pattern for four viewpoints as a configuration example in the case where the display panel 2 is in the first arrangement state. In this configuration example, the display panel 2 displays four parallax images which are combined into one screen while spatially separated from one another. In the configuration example, a pixel group (R4, G4, B4) is added as a pixel 4-4 for a fourth viewpoint (a pixel displaying a fourth parallax image) to the configuration example for three viewpoints in FIG. 4. The basic configuration of the configuration example is the same as that of the configuration example for three viewpoints, except that the pixel 4-4 for the fourth viewpoint is added.

Figure 11:
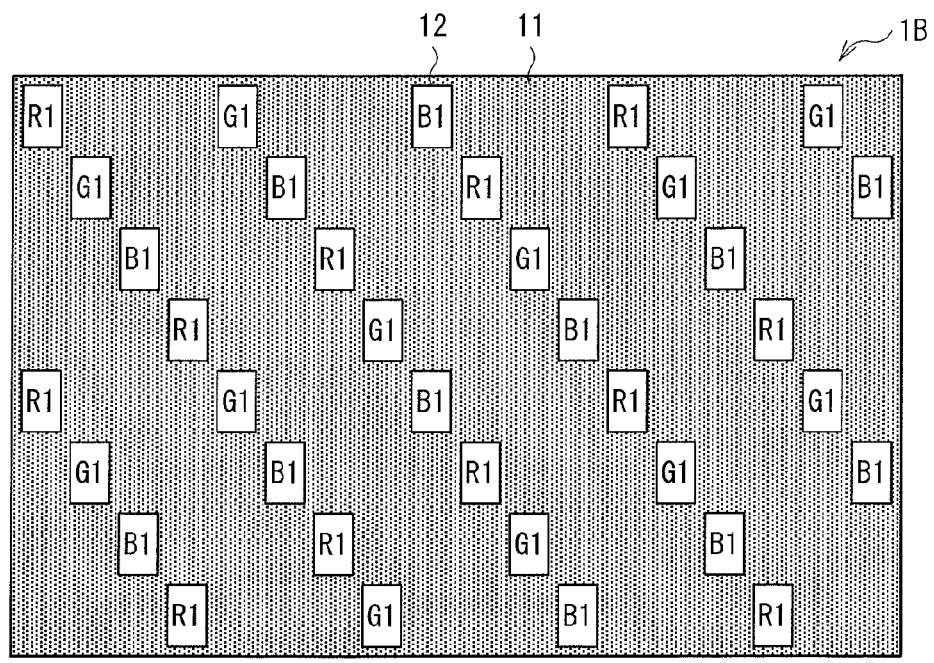
FIG. 11 is a plan view illustrating a barrier pattern for four viewpoints in the first arrangement state in the stereoscopic display according to the first embodiment.

FIG. 11 illustrates a configuration of a parallax barrier 1B having a barrier pattern for four viewpoints (corresponding to the pixel arrangement pattern in FIG. 10) in the case where the parallax barrier 1B is in the first arrangement state. In addition, in FIG. 11, as in the case of FIG. 5, a state where only the pixel groups (R1, G1, B1) for the first viewpoint are allowed to be viewed through the slit sections 12 is illustrated. When viewed from a different direction, only pixel groups for a different viewpoint corresponding to the direction are allowed to be viewed through the slit sections 12. Thus, as in the case of FIG. 5, the barrier pattern is formed so that only pixel groups for a specific viewpoint corresponding to a viewing direction are allowed to be viewed.

Figure 12:
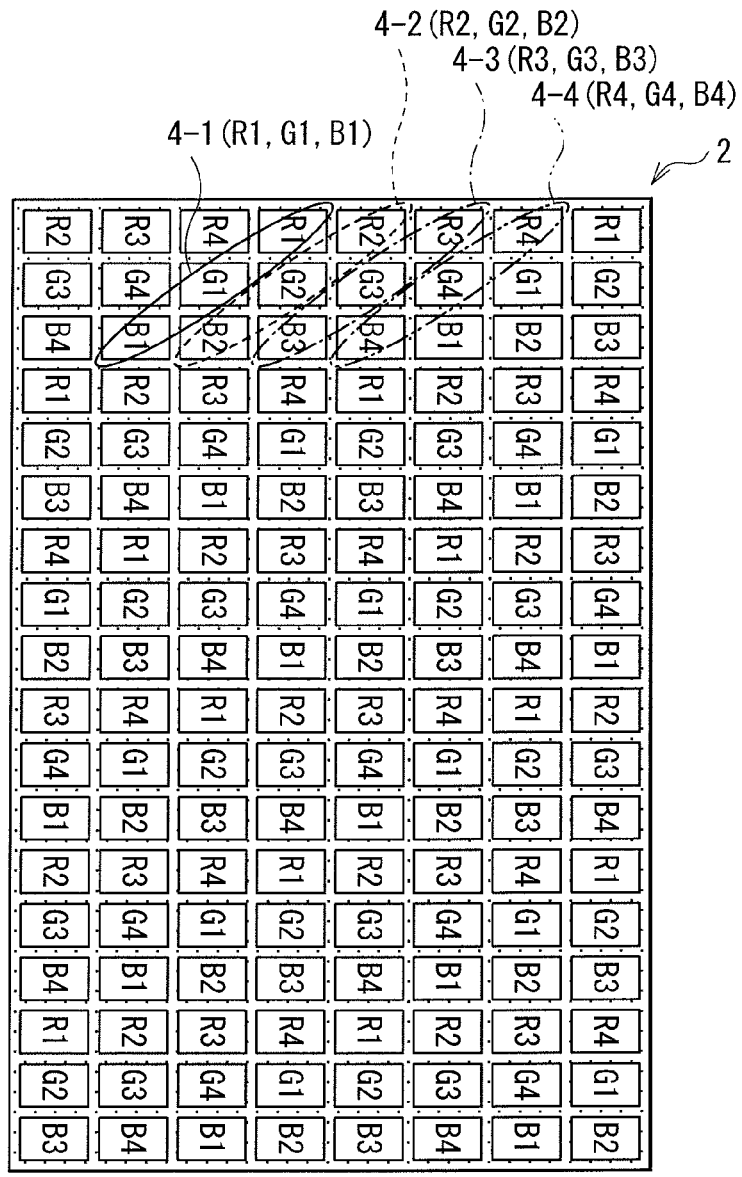
FIG. 12 is a plan view illustrating a pixel arrangement for four viewpoints in the second arrangement state in the stereoscopic display according to the first embodiment.
Figure 13:
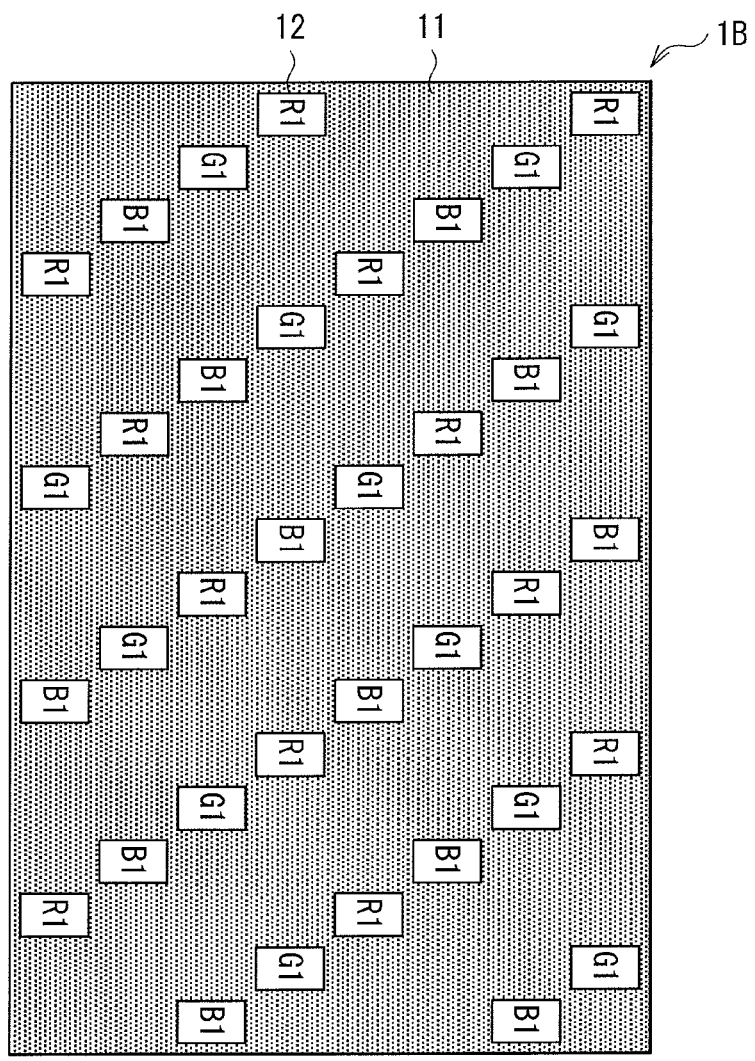
FIG. 13 is a plan view illustrating a barrier pattern for four viewpoints in the second arrangement state in the stereoscopic display according to the first embodiment.

FIG. 12 illustrates a pixel arrangement pattern for four viewpoints in the case where the display panel 2 is in the second arrangement state. The pixel arrangement pattern is a pattern where the arrangement direction of the display panel 2 is rotated to the right by 90°, in a plane parallel to the display surface, from the arrangement direction of the display panel 2 illustrated in FIG. 10. Moreover, FIG. 13 illustrates a barrier pattern for four viewpoints (corresponding to the pixel arrangement pattern in FIG. 12) in the case where the parallax barrier 1B is in the second arrangement state. The barrier pattern is a pattern where the arrangement direction of the parallax barrier 1B is rotated to the right by 90°, in a plane parallel to the display surface, from the arrangement direction of the parallax barrier 1B illustrated in FIG. 11. In addition, in FIG. 13, as in the case of FIG. 5, a state where only pixel groups (R1, G1, B1) for the first viewpoint are allowed to be viewed through the slit sections 12 is illustrated as an example.

As in the case of the configuration example for three viewpoints, also in the configuration example for four viewpoints, in the display panel 2, a relative positional relationship among parallax images in the horizontal direction is the same in the first arrangement state and the second arrangement state. Thereby, in both of the first arrangement state and the second arrangement state, parallax images for viewpoints are allowed to be alternately displayed in the horizontal direction. Moreover, the barrier pattern of the parallax barrier 1B is a pattern allowed to separate parallax images for the viewpoints from one another in the horizontal direction in both of the first arrangement state and the second arrangement state. Thereby, in both of the first arrangement state and the second arrangement state, stereoscopic vision from four viewpoints is achievable.

Configuration for Five Viewpoints

Figure 14:
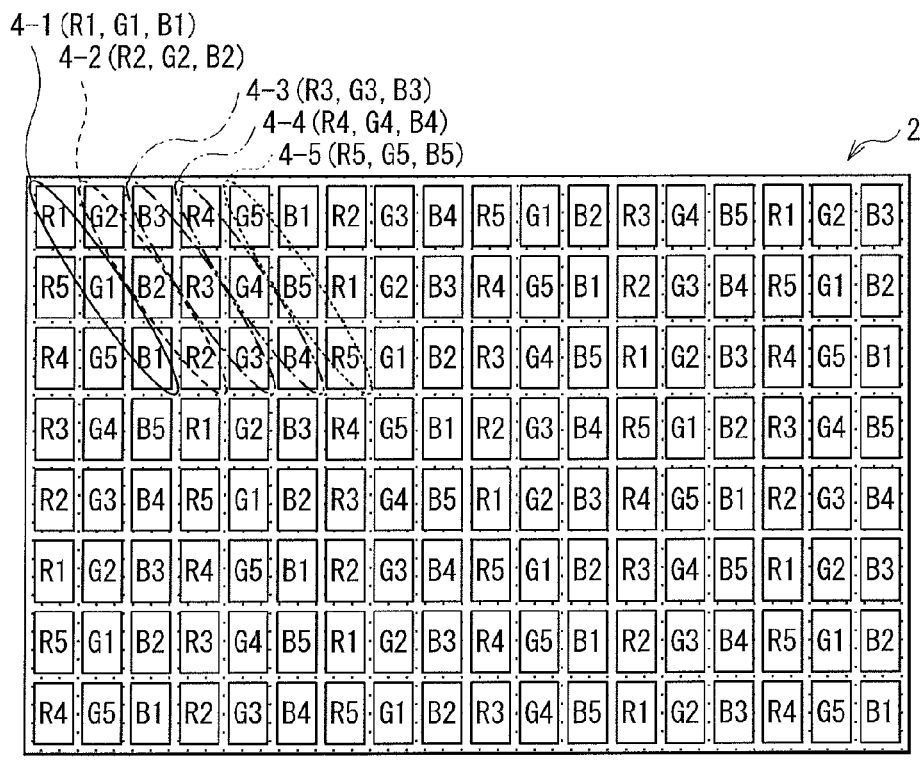
FIG. 14 is a plan view illustrating a pixel arrangement for five viewpoints in the first arrangement state in the stereoscopic display according to the first embodiment.

FIG. 14 illustrates a pixel arrangement pattern for five viewpoints as a configuration example in the case where the display panel 2 is in the first arrangement state. In this configuration example, the display panel 2 displays five parallax images which are combined into one screen while spatially separated from one another. In the configuration example, a pixel group (R4, G4, B4) and a pixel group (R5, G5, B5) are added as a pixel 4-4 for a fourth viewpoint (a pixel displaying a fourth parallax image) and a pixel 4-5 for a fifth viewpoint (a pixel displaying a fifth parallax image), respectively, to the configuration example for three viewpoints in FIG. 4. The basic configuration of the configuration example is the same as that of the configuration example for three viewpoints, except that the pixel 4-4 for the fourth viewpoint and the pixel 4-5 for the fifth viewpoint are added.

Figure 15:
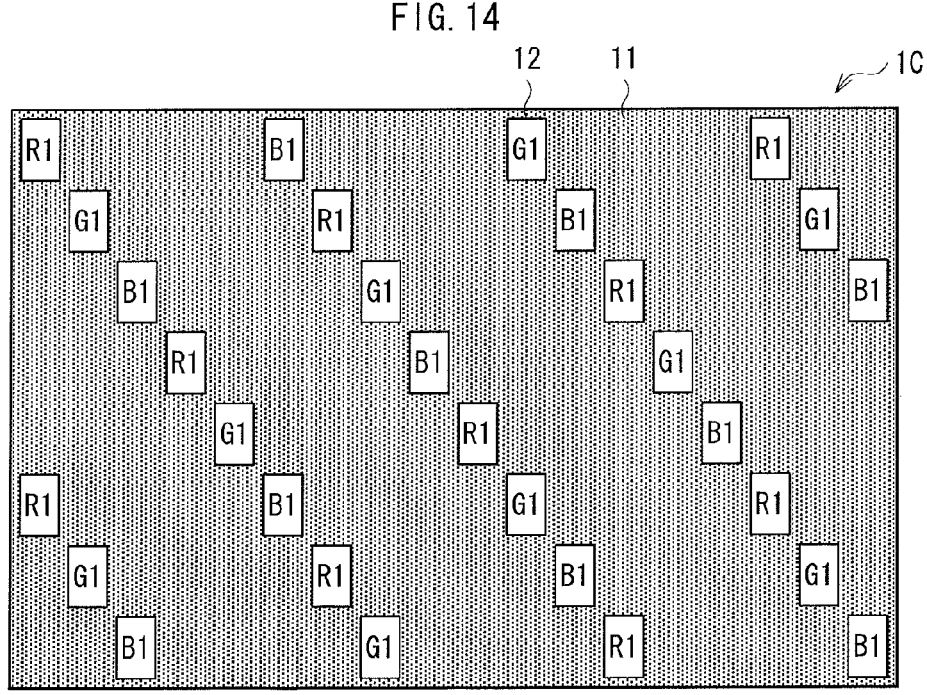
FIG. 15 is a plan view illustrating a barrier pattern for five viewpoints in the first arrangement state in the stereoscopic display according to the first embodiment.

FIG. 15 illustrates a configuration of a parallax barrier 1C having a barrier pattern for five viewpoints (corresponding to a pixel arrangement pattern in FIG. 14) in the case where the parallax barrier 1C is in the first arrangement state. In addition, in FIG. 15, as in the case of FIG. 5, a state where only the pixel groups (R1, G1, B1) for the first viewpoint are allowed to be viewed through the slit sections 12 is illustrated as an example. When viewed from a different direction, only pixel groups for a different viewpoint corresponding to the direction are allowed to be viewed through the slit sections 12. Thus, as in the case of FIG. 5, the barrier pattern is formed so that only pixel groups for a specific viewpoint corresponding to a viewing direction are allowed to be viewed.

Figure 16:
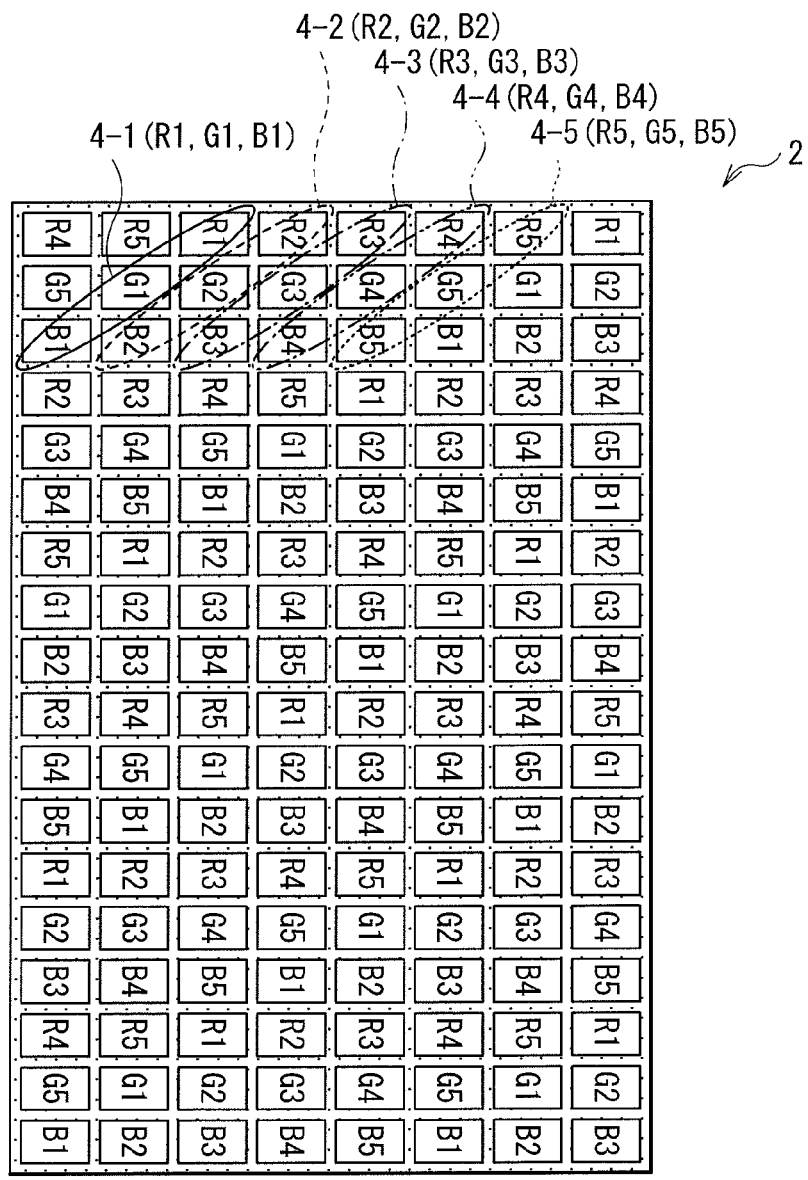
FIG. 16 is a plan view illustrating a pixel arrangement for five viewpoints in the second arrangement state in the stereoscopic display according to the first embodiment.
Figure 17:
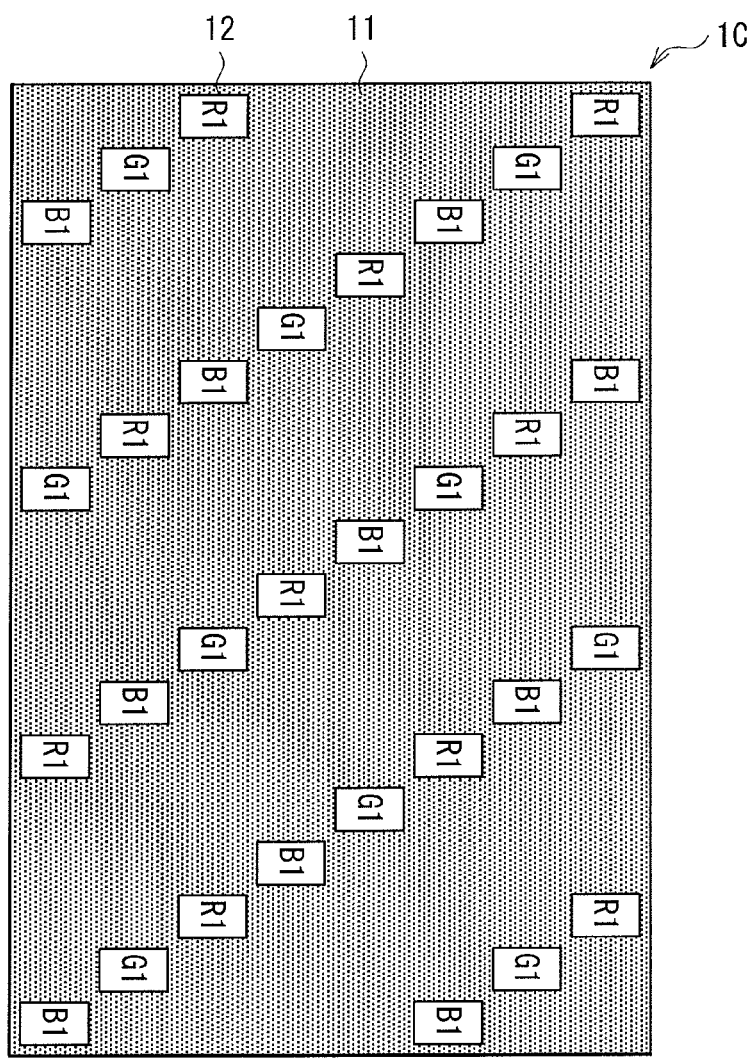
FIG. 17 is a plan view illustrating a barrier pattern for five viewpoints in the second arrangement state in the stereoscopic display according to the first embodiment.

FIG. 16 illustrates a pixel arrangement pattern for five viewpoints in the case where the display panel 2 is in the second arrangement state. The pixel arrangement pattern is a pattern where the arrangement direction of the display panel 2 is rotated to the right by 90°, in a plane parallel to the display surface, from the arrangement direction of the display panel 2 illustrated in FIG. 14. Moreover, FIG. 17 illustrates a barrier pattern for five viewpoints (corresponding to the pixel arrangement pattern in FIG. 16) in the case where the parallax barrier 1C is in the second arrangement state. The barrier pattern is a pattern where the arrangement direction of the parallax barrier 1C is rotated to the right by 90°, in a plane parallel to the display surface, from the arrangement direction of the parallax barrier 1C illustrated in FIG. 15. In addition, in FIG. 17, as in the case of FIG. 5, a state where only the pixel groups (R1, G1, B1) for the first viewpoint are allowed to be viewed through the slit sections 12 is illustrated as an example.

As in the case of the configuration example for three viewpoints, also in the configuration example for five viewpoints, in the display panel 2, a relative positional relationship among parallax images in the horizontal direction is the same in the first arrangement state and the second arrangement state. Thereby, in both of the first arrangement state and the second arrangement state, parallax images for viewpoints are allowed to be alternately displayed in the horizontal direction. Moreover, the barrier pattern of the parallax barrier 1C is a pattern allowed to separate parallax images for the viewpoints from one another in the horizontal direction in both of the first arrangement state and the second arrangement state. Thereby, in both of the first arrangement state and the second arrangement state, stereoscopic vision from five viewpoints is achievable.

Operation and Effects of Stereoscopic Display

In the stereoscopic display, the number N, which corresponds to the number N of viewpoints, of parallax images spatially separated from one another are displayed in one screen in the display panel 2. Display image light from the display panel 2 is optically separated by the parallax barrier 1 (or 1A, 1B or 1C) so as to achieve stereoscopic vision In the stereoscopic display, the arrangement pattern of sub-pixels in the display panel 2 and the barrier pattern in the parallax barrier 1 (or 1A, 1B or 1C) are optimized so that stereoscopic vision from the number N of viewpoints is achievable in both of the first arrangement state (refer to the part A in FIG. 2) and the second arrangement state (refer to the part B in FIG. 2). Thereby, stereoscopic vision from the number N of viewpoints is achievable in both of two different arrangement states.

Now, stereoscopic vision from three viewpoints will be described below referring to FIG. 1. In the stereoscopic display, in the case where a multi-view composite image displayed on the display panel 2 is viewed through the parallax barrier 1, when the composite image is viewed from a specific viewing position, a left eye 10L and a right eye 10R are allowed to view only specific parallax images, respectively, so that a stereoscopic image is perceived. For example, when the composite image is viewed from a first viewing position P1, the left eye 10L perceives only light L2 from the second parallax image displayed on the pixel 4-2 for the second viewpoint, and the right eye 10R perceives only light L1 from the first parallax image displayed on the pixel 4-1 for the first viewpoint. Thereby, in the first viewing position P1, a stereoscopic image based on the second parallax image and the first parallax image is perceived. When the composite image is viewed from a different viewing position, that is, a second viewing position P2, for example, the left eye 10L perceives only the light L1 from the first parallax image displayed on the pixel 4-1 for the first viewpoint, and the right eye 10R perceives only light L3 from the third parallax image displayed on the pixel 4-3 for the third viewpoint. Thereby, in the second viewing position P2, a stereoscopic image based on the first parallax image and the third parallax image is perceived. Thus, motion parallax is obtained by viewing a different parallax image when viewed from a different viewing position. On the other hand, when viewed from a specific viewing position, light from a parallax image not contributing to stereoscopic vision is shielded by the shielding section 11 of the parallax barrier 1. For example, when viewed from the first viewing position P1, light L3 from the pixel 4-3 for the third viewpoint is shielded by the shielding section 11 of the parallax barrier 1 so that the viewer does not perceive the parallax image displayed on the pixel 4-3.

Figure 2:
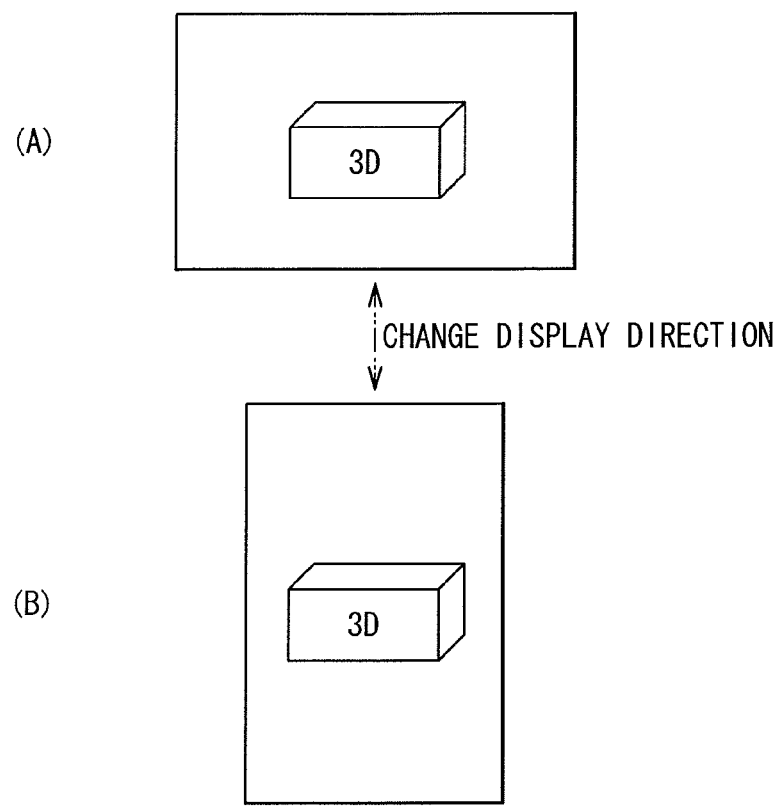
FIG. 2 is an explanatory diagram, parts A and B in FIG. 2 illustrate a display example in a first arrangement state and a display example in a second arrangement state, respectively, in the stereoscopic display according to the first embodiment.

In the embodiment, such stereoscopic vision is achievable in both of the first arrangement state (refer to the part A in FIG. 2) and the second arrangement state (refer to the part B in FIG. 2).

Second Embodiment

Next, a stereoscopic display according to a second embodiment will be described below. In addition, like components are denoted by like numerals as of the stereoscopic display according to the first embodiment, and will not be further described.

In the first embodiment, a configuration example in which stereoscopic vision from the number N of viewpoints is achievable in both of the first arrangement state (refer to the part A in FIG. 2) and the second arrangement state (refer to the part B in FIG. 2) is described. In this case, in both of the first arrangement state and the second arrangement state, sub-pixels of three colors R, G and B are used as one pixel, so horizontal resolution is reduced to 3/N, and vertical resolution is reduced to ⅓. Multiplication of the horizontal resolution and the vertical resolution is equal to 1/N, so the number of pixels for one viewpoint is 1/N of the total number of pixels in the display panel 2.

In the embodiment, in the first arrangement state, stereoscopic vision from the number N=3 or greater of viewpoints is achieved, and in the second arrangement state, stereoscopic vision from two viewpoints is achieved. It is because the number of pixels in the horizontal direction is smaller in the second arrangement state (portrait-oriented display), so the number of viewpoints is reduced to be smaller than that in the first arrangement state (landscape-oriented display), so that a decline in resolution in the horizontal direction is reduced. Human vision is considered more sensitive to a decline in resolution in the horizontal direction than a decline in resolution in the vertical direction, so it is effective when a decline in resolution in portrait-oriented display is further reduced. Now, the case where the number of viewpoints in stereoscopic vision is N=4 in the first arrangement state and N=2 in the second arrangement state will be described below as an example.

Figure 18:
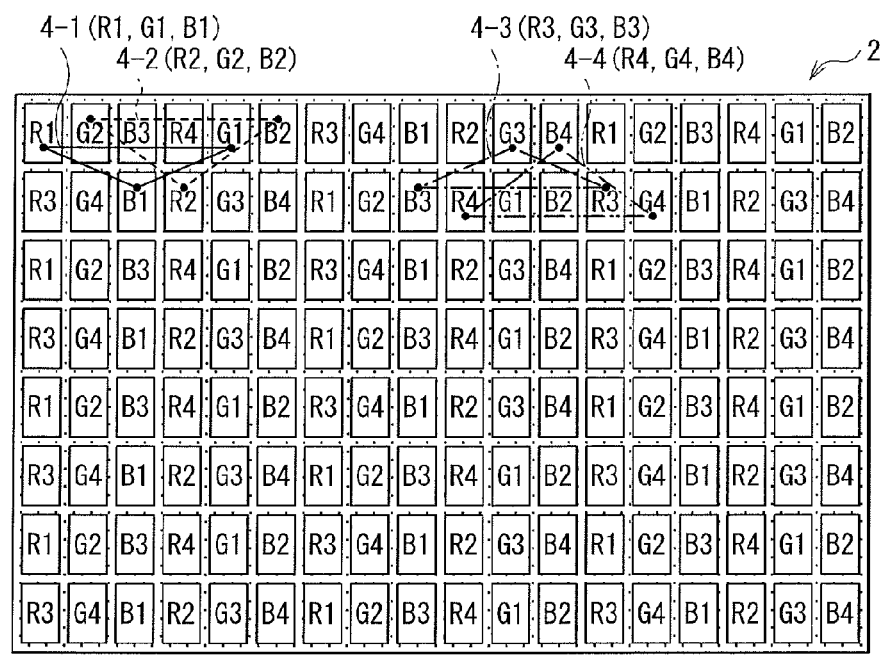
FIG. 18 is a plan view illustrating a pixel arrangement in a first arrangement state in a stereoscopic display according to a second embodiment.

FIG. 18 illustrates a pixel arrangement pattern according to the embodiment as a configuration example in the case where the display panel 2 is in the first arrangement state. In this configuration example, the display panel 2 displays four parallax images which are combined into one screen while spatially separated from one another. In FIG. 18, the pixel group (R1, G1, B1) is the pixel 4-1 for the first viewpoint (a pixel displaying the first parallax image). Moreover, the pixel group (R2, G2, B2), the pixel group (R3, G3, B3) and the pixel group (R4, G4, B4) are the pixel 4-2 for the second viewpoint (a pixel displaying the second parallax image), the pixel 4-3 for the third viewpoint (a pixel displaying the third parallax image) and the pixel 4-4 for the fourth viewpoint (a pixel displaying the fourth parallax image), respectively.

As illustrated in FIG. 18, in the first arrangement state, sub-pixels of a same color not for N=4 viewpoints but for 2 viewpoints are cyclically arranged along a vertical line. Sub-pixels of different respective colors for N=4 viewpoints are cyclically arranged along a horizontal line. Moreover, such an arrangement pattern that a sub-pixel in a first horizontal line and a sub-pixel, immediately adjacent to the sub-pixel in a vertical direction, in a second horizontal line immediately adjacent to the first horizontal line are arranged for respective viewpoints different from each other is used. For example, when a pixel line in the uppermost row and a pixel line in the second uppermost row are defined as the first horizontal line and the second horizontal line, respectively, sub-pixels for different respective viewpoints are cyclically arranged in order of (R1, G2, B3, R4, G1, . . . ) in the first horizontal line. In the second horizontal line, sub-pixels for different respective viewpoints are cyclically arranged in order of (R3, G4, B1, R2, G3, . . . ). In this case, the leftmost pixel in the first horizontal line is R1, and the leftmost pixel in the second horizontal line is R3, and sub-pixels are arranged in two adjacent horizontal lines so that vertically adjacent sub-pixels have different respective viewpoints form each other.

In such a pixel arrangement, as illustrated in FIG. 18, a combination of sub-pixels of three colors forming a triangle is used as a unit pixel (one pixel) for color display to display a parallax image for each viewpoint. In other words, for example, when a pixel line in the uppermost row is defined as a first horizontal line, and a pixel line in the second uppermost row is defined as a second horizontal line, two sub-pixels in the first horizontal line and one sub-pixel in the second horizontal line are combined to form one pixel. For example, at a top left corner of FIG. 18, two sub-pixels (R1, G1) on the first horizontal line and one sub-pixel (B1) on the second horizontal line are combined to form one pixel 4-1 for the first viewpoint.

Figure 19:
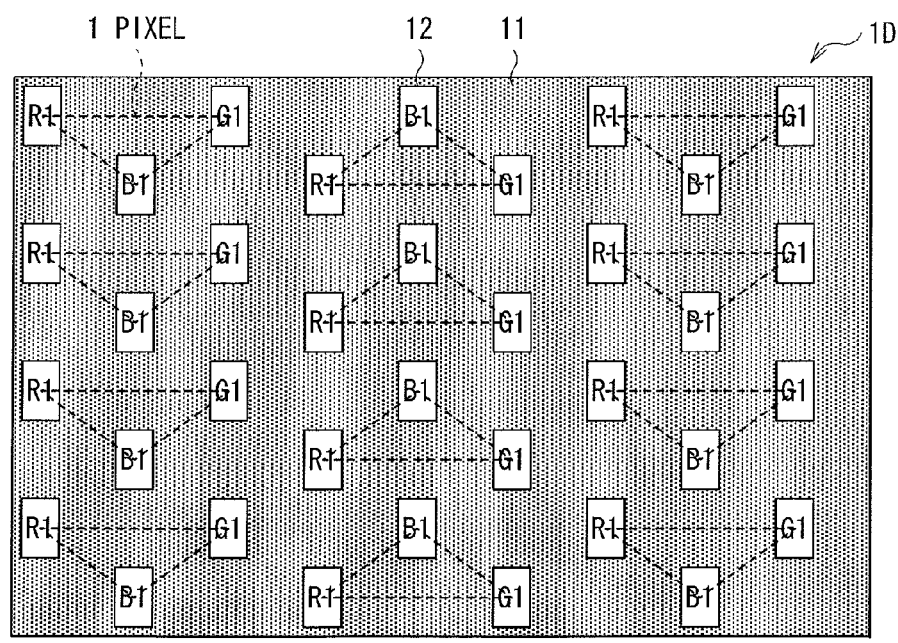
FIG. 19 is a plan view illustrating a barrier pattern in the first arrangement state in the stereoscopic display according to the second embodiment.

FIG. 19 illustrates a configuration of a barrier pattern of a parallax barrier 1D (corresponding to the pixel arrangement pattern in FIG. 18) according to the embodiment in the case where the parallax barrier 1D is in the first arrangement. In addition, in FIG. 19, as in the case of FIG. 5, a state where only pixel groups (R1, G1, B1) for the first viewpoint are allowed to be viewed through the slit sections 12 is illustrated as an example. When viewed from a different direction, only pixel groups for a different viewpoint corresponding to the direction are allowed to be viewed through the slit sections 12. Thus, as in the case of FIG. 5, the barrier pattern is formed so that only pixel groups for a specific viewpoint corresponding to a viewing direction are allowed to be viewed. More specifically, in the first arrangement state, the slit sections 12 are arranged in such a manner that one slit section 12 is allocated for every N (in this case, four) sub-pixels in the horizontal direction. Moreover, the slit sections 12 in the first horizontal line and the second horizontal line are arranged in a staggered configuration in such a manner that each of the slit sections 12 in the first horizontal line is arranged in a position shifted from the corresponding slit section 12 in the second horizontal line by an offset distance of two sub-pixels in the horizontal direction. For example, when a line of the slit sections 12 corresponding to a pixel line in the uppermost row and a line of the slit sections 12 corresponding to a pixel line in the second uppermost row are defined as a first horizontal line and a second horizontal line, respectively, the slit sections 12 in the second horizontal line are shifted to the right by two sub-pixels from the slit sections 12 in the first horizontal line. In addition, the slit sections 12 in the second horizontal line may be shifted not to the right but to the left by two sub-pixels.

Figure 20:
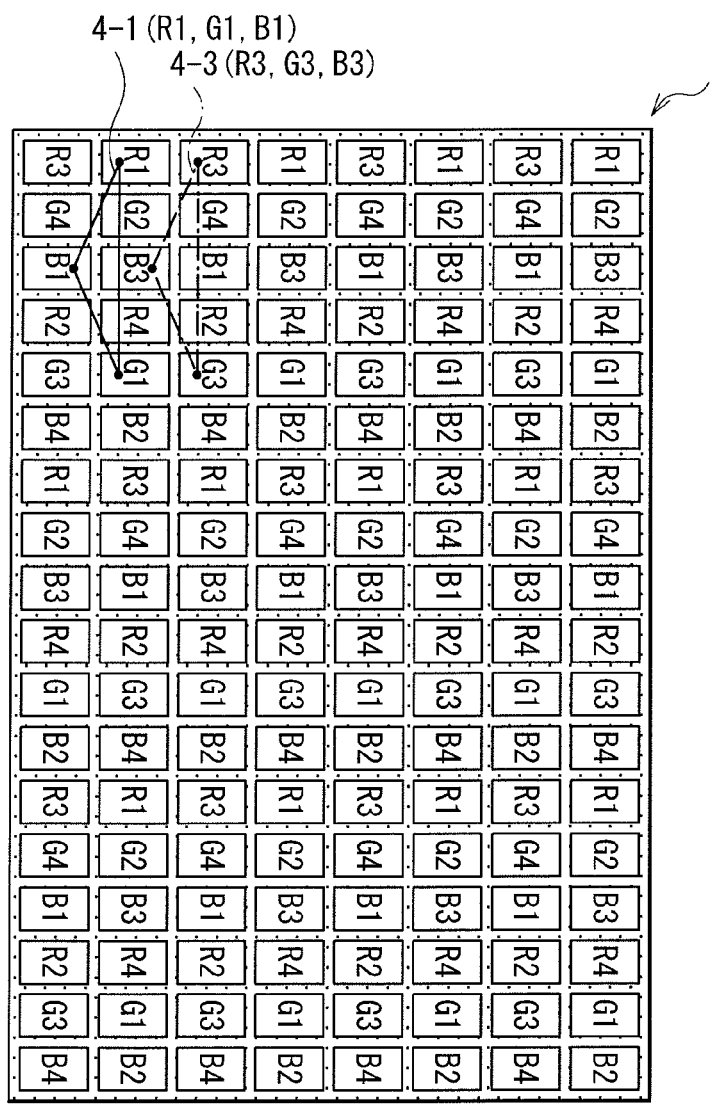
FIG. 20 is a plan view illustrating a pixel arrangement in a second arrangement state in the stereoscopic display according to the second embodiment.
Figure 21:
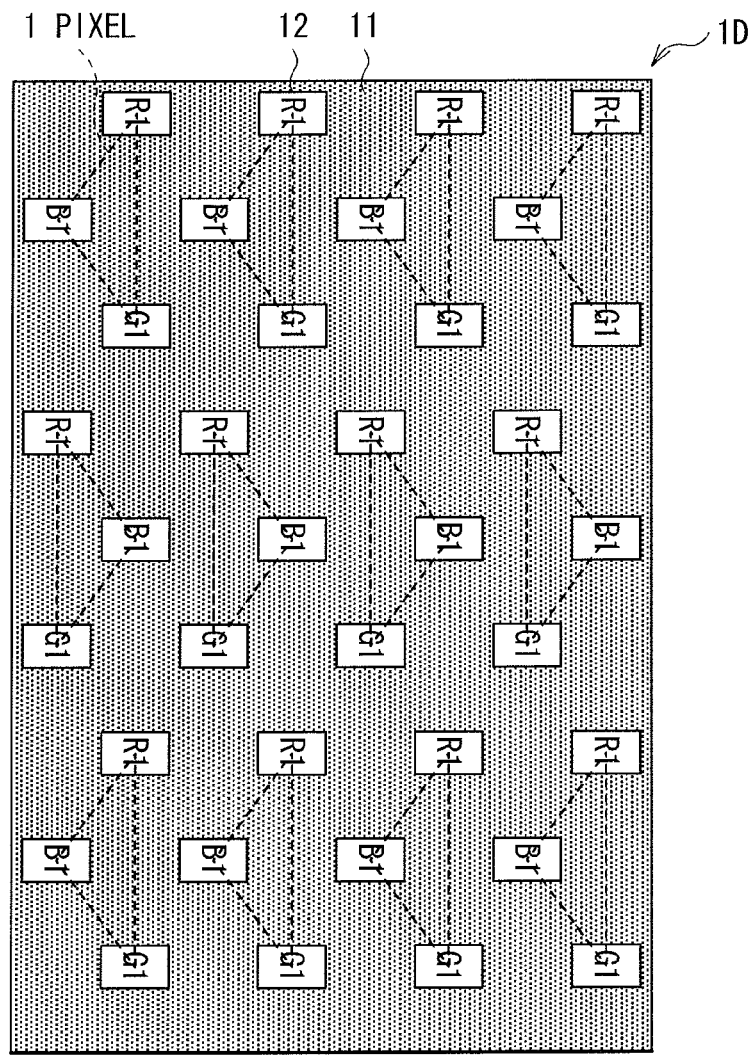
FIG. 21 is a plan view illustrating a barrier pattern in the second arrangement state in the stereoscopic display according to the second embodiment.
Figure 22:
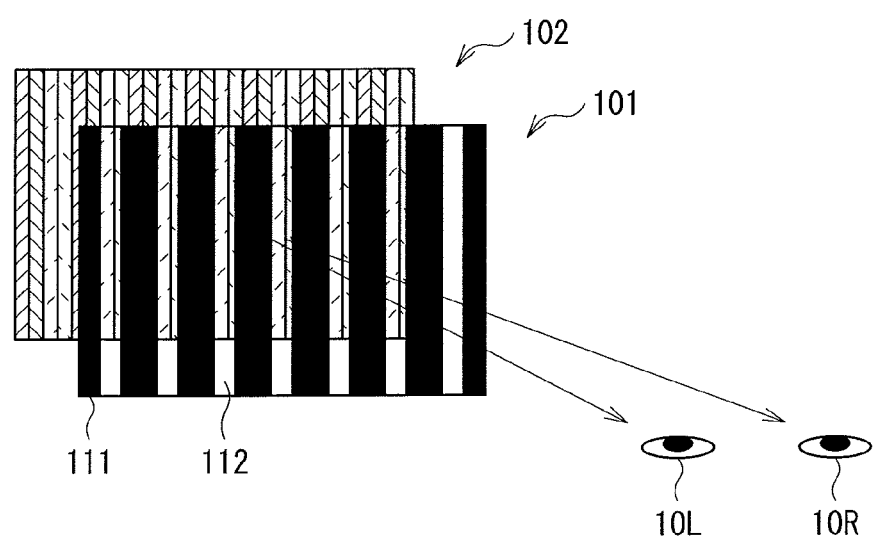
FIG. 22 is a configuration diagram illustrating a typical configuration example of a parallax barrier system stereoscopic display.

FIG. 20 illustrates a pixel arrangement pattern according to the embodiment in the case where the display panel 2 is in the second arrangement state. The pixel arrangement pattern is a pattern where the arrangement direction of the display panel 2 is rotated to the right by 90°, in a plane parallel to the display surface, from the arrangement direction of the display panel 2 illustrated in FIG. 18. Moreover, FIG. 21 illustrates a barrier pattern (corresponding to the pixel arrangement pattern in FIG. 20) in the case where the parallax barrier 1D is in the second arrangement state. The barrier pattern is a pattern where the arrangement direction of the parallax barrier 1D is rotated to the right by 90°, in a plane parallel to the display surface, from the arrangement direction of the parallax barrier 1D illustrated in FIG. 19. In addition, in FIG. 21, as in the case of FIG. 5, a state where only the pixel groups (R1, G1, B1) for the first viewpoint are allowed to be viewed through the slit section 12 is illustrated as an example.

In the second arrangement state, as illustrated in FIG. 20, stereoscopic vision from two viewpoints is achieved with use of the pixel groups (R1, G1, B1) for the first viewpoint and the pixel groups (R3, G3, B3) for the third viewpoint. Parallax images may or may not be displayed on the pixel groups (R2, G2, B2) for the second viewpoint and the pixel groups (R4, G4, B4) for the fourth viewpoint, respectively (the parallax images are shielded by the shielding section 11 of the parallax barrier 1D). In other words, in the second arrangement state, stereoscopic vision is achieved by effectively using each sub-pixel in the horizontal direction and effectively using sub-pixels in every other vertical line. For example, in an example in FIG. 20, a pixel group in the first line in the uppermost row contributes to stereoscopic vision, but a pixel group in the second line next to the first line does not contribute to stereoscopic vision, and a pixel group in the third line next to the second line contributes to stereoscopic vision.

Thus, in the embodiment, in the second arrangement state which is portrait-oriented display, the number of viewpoints in stereoscopic vision is smaller than that in the first arrangement state, so a decline in resolution in the horizontal direction in stereoscopic display in the second arrangement state is allowed to be reduced.

Other Embodiments

The present application is not limited to the above-described embodiments, and may be variously modified. For example, in the above-described embodiments, in the case where vision from a large number N=3 or greater of viewpoints is achieved, there is a possibility that all of the number N of parallax images are not prepared. For example, it may be considered that even though a stereoscopic display has a configuration for four viewpoints, image data for display includes only two parallax images, that is, a parallax image L for left eye and a parallax image R for right eye. In such a case, two parallax images L and R may be appropriately allocated to and displayed on pixels for four viewpoints, for example, in order of L/L/R/R or L/L/L/R, respectively. In the case where the parallax images are displayed in such a manner, stereoscopic vision is achievable only when images L/R enter into left and right eyes of a viewer, respectively, and on the other hand, when images L/L enters into the left and right eyes, respectively, the parallax image L for left eye which is spatially separated enters into both eyes so that a two-dimensional image with high resolution is allowed to be viewed.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A stereoscopic display comprising:
a display panel including a display surface in which sub-pixels of a plurality of colors are two-dimensionally arranged in a predetermined arrangement pattern, and displaying a plurality of parallax images corresponding to the number of viewpoints in stereoscopic vision, the parallax images being combined into one screen while spatially separated from one another; and
a parallax barrier arranged to face the display surface, including a barrier pattern configured of transmission sections allowing display image light from the display panel to pass therethrough and a shielding section shielding the display image light, and optically separating, with the barrier pattern, the parallax images displayed on the display panel from one another so as to achieve stereoscopic vision,
wherein the display surface of the display panel has a vertical length different from a horizontal length thereof,
the predetermined arrangement pattern of the sub-pixels in the display panel and the barrier pattern in the parallax barrier are configured in such a manner that stereoscopic vision is achieved when the display panel and the parallax barrier are both in a first arrangement state and in a second arrangement state, the first arrangement state and the second arrangement state having such a positional relationship that vertical direction and horizontal direction are interchanged with each other,
wherein the transmission sections in adjacent rows or columns of the parallax barrier are arranged in a staggered configuration in such a manner that each of the transmission sections in a first row or column is arranged at a position shifted from the corresponding transmission section in an adjacent second row or column by an offset distance of a predetermined number of sub-pixels,
wherein in the second arrangement state, stereoscopic vision is achieved by using each sub-pixel in the horizontal direction and using sub-pixels in every other vertical line in the vertical direction,
wherein the sub-pixels are arranged in a repeating pattern of four different pixel groups that are arranged in triangular shapes and that are offset from one another, and
wherein in the second arrangement state, stereoscopic vision from two viewpoints is achieved with use of first pixel groups for the first viewpoint and third pixel groups for the third viewpoint, and the barrier pattern is configured to shield the second and fourth pixel groups.

2. The stereoscopic display according to claim 1, wherein the first arrangement state is a state of landscape orientation where a length and the number of pixels in a horizontal direction of the display surface are larger than those in a vertical direction, and the second arrangement state is a state of portrait orientation where the length and the number of pixels in the vertical direction of the display surface are larger than those in the horizontal direction, and
when the display panel and the parallax barrier are in the first arrangement state, sub-pixels of a same color are arranged along a vertical line and sub-pixels of different respective colors are cyclically arranged along a horizontal line, and sub-pixels for different respective viewpoints in stereoscopic vision are cyclically arranged along the horizontal line in such a manner that a first sub-pixel in a first horizontal line and a second sub-pixel in a second horizontal line immediately adjacent to the first horizontal line, the second sub-pixel immediately adjacent to the first sub-pixel in the vertical direction, are arranged for respective viewpoints different from each other.

3. The stereoscopic display according to claim 2, wherein when the display panel and the parallax barrier are in the first arrangement state, the transmission sections of the parallax barrier are arranged in such a manner that one transmission section is allocated for every N sub-pixels in the horizontal direction, where N is an integer of 2 or greater representing the number of viewpoints in stereoscopic vision in the first arrangement state, and the transmission sections in the first and second horizontal lines are arranged in a staggered configuration in such a manner that each of the transmission sections in the first horizontal line is arranged at a position shifted from the corresponding transmission section in the second horizontal line by an offset distance of the predetermined number of sub-pixels.

4. The stereoscopic display according to claim 3, wherein stereoscopic vision from three or more (N≥3) viewpoints is performed when the display panel and the parallax barrier are in the first arrangement state, and stereoscopic vision from two viewpoints is performed when the display panel and the parallax barrier are in the second arrangement state.

5. The stereoscopic display according to claim 4, wherein when the display panel and the parallax barrier are in the first arrangement state, sub-pixels corresponding to two respective viewpoints and having a same color are cyclically arranged in the vertical line, and sub-pixels corresponding to three or more respective viewpoints and having multiple colors are cyclically arranged in the horizontal line, and the display panel displays parallax images corresponding to three or more respective viewpoints when the display panel is in the first arrangement state, and displays parallax images corresponding to two respective viewpoints when the display panel is in the second arrangement state, through utilizing a combination of sub-pixels of multiple colors forming a triangle as a unit pixel.

6. The stereoscopic display according to claim 5, wherein when the display panel and the parallax barrier are in the first arrangement state, the transmission sections of the parallax barrier are arranged in such a manner that one transmission section is allocated for every three or more sub-pixels in the horizontal direction, and are arranged in such a manner that one transmission section is allocated for every two-pixels in the vertical direction.

7. The stereoscopic display according to claim 3, wherein when the display panel and the parallax barrier are in the first arrangement state, sub-pixels corresponding to N respective viewpoints and having a same color are cyclically arranged in the vertical line, and the sub-pixels corresponding to N respective viewpoints and having multiple colors are cyclically arranged in the horizontal line, and the display panel displays, both in the first and second arrangement states, parallax images corresponding to N respective viewpoints through utilizing a combination of sub-pixels of multiple colors which are diagonally adjacent to one another as a unit pixel.

8. The stereoscopic display according to claim 3, wherein when the display panel and the parallax barrier are in the first arrangement state, sub-pixels corresponding to first and second respective viewpoints and having a same color are cyclically arranged in the vertical line, and sub-pixels corresponding to the first and second respective viewpoints and having multiple colors are cyclically arranged in the horizontal line, and the display panel displays, both in the first and second arrangement states, parallax images corresponding to the first and second respective viewpoints, through utilizing a combination of sub-pixels of multiple colors forming a triangle as a unit pixel.

9. The stereoscopic display according to claim 8, wherein when the display panel and the parallax barrier are in the first arrangement state, the transmission sections of the parallax barrier are arranged in such a manner that one transmission section is allocated for every N sub-pixels in the horizontal direction, and the transmission sections in the first and second horizontal lines are arranged in a staggered configuration in such a manner that each of the transmission sections in the first horizontal line is arranged at a position shifted from the corresponding transmission section in the second horizontal line by an offset distance of one sub-pixel.

10. The stereoscopic display according to claim 1, wherein in the second arrangement state, the number of viewpoints in stereoscopic vision is smaller than that in the first arrangement state.

11. A stereoscopic display comprising:
a display panel in which sub-pixels of a plurality of colors are arranged in a predetermined arrangement pattern; and
a parallax barrier having a barrier pattern including transmission sections allowing light to pass therethrough and a shielding section shielding light,
wherein the arrangement pattern and the barrier pattern are configured in such a manner that stereoscopic vision is achieved when the display panel and the parallax barrier are both in a first arrangement state and in a second arrangement state, the first arrangement state and the second arrangement state having such a positional relationship that vertical direction and horizontal direction are interchanged with each other,
wherein the transmission sections in adjacent rows or columns of the parallax barrier are arranged in a staggered configuration in such a manner that each of the transmission sections in a first row or column is arranged at a position shifted from the corresponding transmission section in an adjacent second row or column by an offset distance of a predetermined number of sub-pixels,
wherein in the second arrangement state, stereoscopic vision is achieved by using each sub-pixel in the horizontal direction and using sub-pixels in every other vertical line in the vertical direction,
wherein the sub-pixels are arranged in a repeating pattern of four different pixel groups that are arranged in triangular shapes and that are offset from one another, and
wherein in the second arrangement state, stereoscopic vision from two viewpoints is achieved with use of first pixel groups for the first viewpoint and third pixel groups for the third viewpoint, and the barrier pattern is configured to shield the second and fourth pixel groups.

12. The stereoscopic display according to claim 11, wherein
when in the first arrangement state, sub-pixels for different respective viewpoints in stereoscopic vision are cyclically arranged along the horizontal line in such a manner that a first sub-pixel in a first horizontal line and a second sub-pixel in a second horizontal line immediately adjacent to the first horizontal line, the second sub-pixel immediately adjacent to the first sub-pixel in the vertical direction, are arranged for respective viewpoints different from each other.

13. The stereoscopic display according to claim 12, wherein
when in the first arrangement state, the transmission sections are arranged in such a manner that one transmission section is allocated for every a plurality of sub-pixels in the horizontal direction, and
the transmission sections in the first and second horizontal lines are arranged in a staggered configuration in such a manner that each of the transmission sections in the first horizontal line is arranged at a position shifted from the corresponding transmission section in the second horizontal line by an offset distance of the predetermined number of sub-pixels.

14. The stereoscopic display according to claim 13,
the display panel displays, both in the first and second arrangement state, utilizes a combination of sub-pixels of multiple colors forming a triangle as a unit pixel.

15. The stereoscopic display according to claim 11,
wherein in the second arrangement state, the number of viewpoints in stereoscopic vision is smaller than that in the first arrangement state.

* * * * *